United States Patent
Moretti et al.

(10) Patent No.: US 9,178,277 B1
(45) Date of Patent: Nov. 3, 2015

(54) SYNTHESIZED-BEAM RFID READER SYSTEM WITH GAIN COMPENSATION AND UNACTIVATED ANTENNA ELEMENT COUPLING SUPPRESSION

(71) Applicant: Impinj, Inc., Seattle, WA (US)

(72) Inventors: Vincent Moretti, Redmond, WA (US); Omer Onen, Redmond, WA (US); Ronald A. Oliver, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 436 days.

(21) Appl. No.: 13/671,373

(22) Filed: Nov. 7, 2012

Related U.S. Application Data

(60) Provisional application No. 61/593,614, filed on Feb. 1, 2012.

(51) Int. Cl.
*H01Q 3/00* (2006.01)
*H01Q 3/34* (2006.01)

(52) U.S. Cl.
CPC ..................................... *H01Q 3/34* (2013.01)

(58) Field of Classification Search
CPC .............. H01Q 3/00; H01Q 3/34; G01S 3/16; G01S 3/28
See application file for complete search history.

(56) References Cited

U.S. PATENT DOCUMENTS

| | | | | |
|---|---|---|---|---|
| 4,410,893 | A * | 10/1983 | Griffee | 343/792 |
| 4,453,164 | A * | 6/1984 | Patton | 342/360 |
| 5,012,256 | A * | 4/1991 | Maddocks | 343/754 |
| 6,448,937 | B1 * | 9/2002 | Aiken et al. | 343/817 |
| 2004/0122321 | A1 * | 6/2004 | Alexandru | 600/459 |
| 2006/0012521 | A1 * | 1/2006 | Small | 342/386 |
| 2007/0273603 | A1 * | 11/2007 | Svensson et al. | 343/844 |
| 2008/0036675 | A1 * | 2/2008 | Fujieda | 343/834 |
| 2010/0253585 | A1 * | 10/2010 | Llorens del Rio et al. | 343/756 |
| 2013/0214983 | A1 * | 8/2013 | Jidhage et al. | 343/798 |

* cited by examiner

*Primary Examiner* — Harry Liu
(74) *Attorney, Agent, or Firm* — Turk IP Law, LLC

(57) ABSTRACT

A synthesized-beam transceiver system steers a beam of a two-dimensional antenna array by activating a first subset of antenna elements to orient the beam in a first direction and subsequently activating a second subset of the antenna elements to orient the beam in a different direction. The system also electrically connects antenna elements that are inactive, not in the first subset, or not in the second subset to a reference potential of the array.

16 Claims, 19 Drawing Sheets

RFID READER SYSTEM CONFIGURATION WITH OPTIONAL LOCAL AND REMOTE COMPONENTS

RFID READER SYSTEM CONFIGURATION WITH
OPTIONAL LOCAL AND REMOTE COMPONENTS

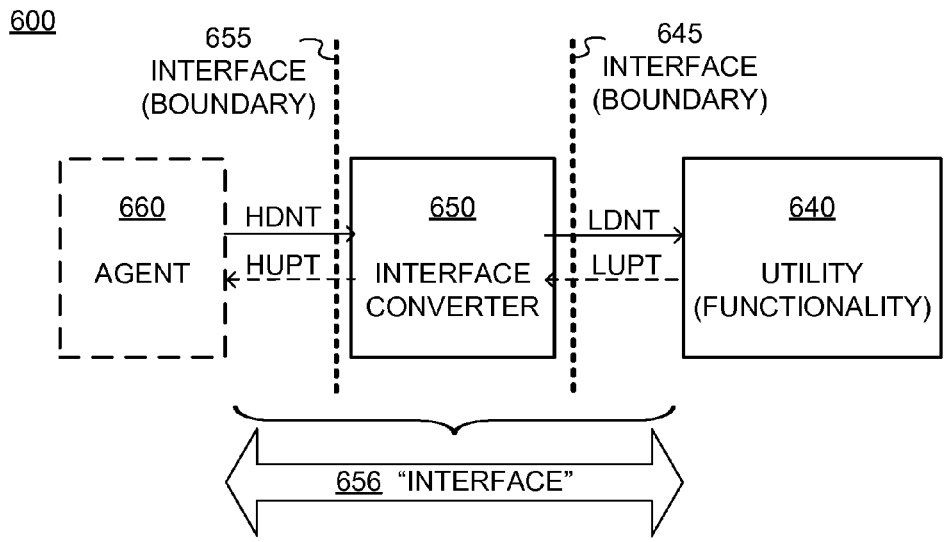
FIG. 6    ARCHITECTURE OF INTERFACE CONVERTER WITH AGENT AND UTILITY
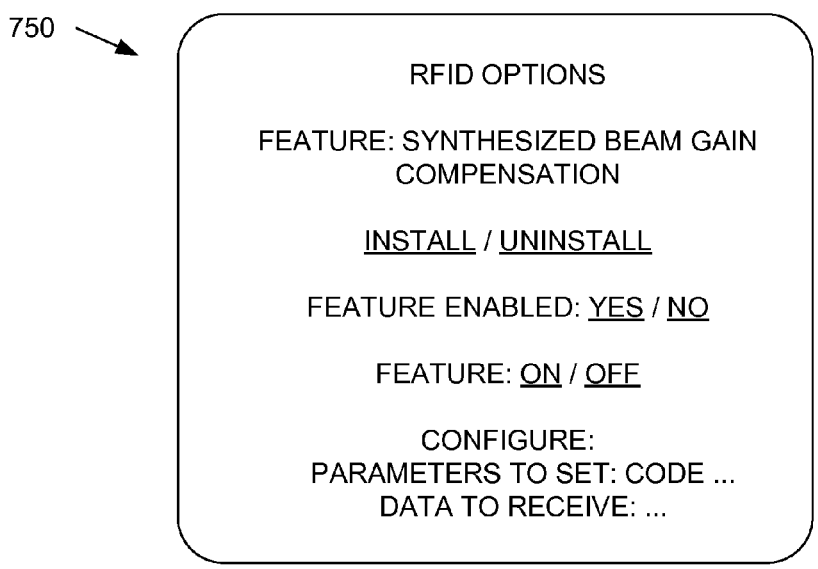
FIG. 7    SAMPLE SCREENSHOT OF INTERFACE CONVERTER EXPOSING TO AGENT OPTIONS TO CONTROL FUNCTIONALITY OF SYNTHESIZED BEAM GAIN COMPENSATION

SYNTHESIZED-BEAM RFID READER SYSTEM WITH GAIN COMPENSATION AND UNACTIVATED ANTENNA ELEMENT COUPLING SUPPRESSION

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave may respond by transmitting back another RF wave. The tag either itself generates the other RF wave, or forms the wave by reflecting back a portion of the interrogating RF wave in a process known as backscatter. Backscatter may take place in a number of ways.

The backscattered RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and any other suitable data. Accordingly, when a reader receives tag data it can learn about the tag and/or the item that hosts the tag.

An RFID tag typically includes an antenna system, a radio section, a power management section, and frequently a logical section, a memory, or both. In some RFID tags the logical section may include a cryptographic algorithm which relies on one or more passwords or keys stored in tag memory. In earlier RFID tags the power management section included an energy storage device such as a battery. RFID tags with an energy storage device are known as battery-assisted, semi-active, or active tags. Advances in semiconductor technology have miniaturized the electronics so much that an RFID tag can be powered solely by the RF signal it receives. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Synthesized-beam antennas (SBAs) use multiple antenna elements to generate radio frequency (RF) radiation patterns with varying shapes and orientations. These radiation patterns can be used to receive or transmit signals in particular directions. However, in some cases, radiation patterns oriented in different directions may have different power. For example, a radiation pattern oriented in a particular direction may have higher power than a radiation pattern oriented in a different direction. Since the effectiveness of many antenna applications is directly related to the power of the generated radiation pattern, having radiation patterns with reduced power may be undesirable.

Some embodiments are directed to methods and systems for steering a beam of a two-dimensional antenna array by activating or driving a first subset of antenna elements to orient the beam in a first direction, electrically connecting at least one antenna element not in the first subset to a reference potential of the antenna array, and subsequently activating or driving a second subset of the antenna elements to orient the beam in a second direction different from the first and electrically connecting at least one antenna element not in the second subset to the reference potential.

Other embodiments are directed to methods and systems for providing a conducted power to a two-dimensional antenna array to generate a beam with a first radiated peak power at a first location, and in response to the beam being directed to a second location, adjusting the conducted power such that a second radiated peak power at the second location is substantially the same as the first radiated peak power.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Embodiments are directed to a synthesized-beam antenna transceiver system that can compensate for beam gain degradation due to undesired coupling with radiation pattern side lobes and/or floating antenna elements. The transceiver system may compensate for beam gain degradations by varying the conducted power provided to the antenna elements based on stored or sensed transmit power data and/or terminating unused antenna elements to a reference potential.

Figure 1:
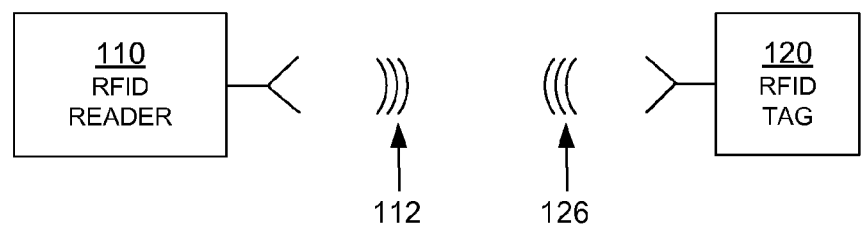
FIG. 1 is a block diagram of components of an RFID system.

FIG. 1 is a diagram showing components of a typical RFID system 100, incorporating embodiments. An RFID reader 110 transmits an interrogating RF wave 112. RFID tag 120 in the vicinity of reader 110 may sense interrogating RF wave 112 and generate wave 126 in response. RFID reader 110 senses and interprets wave 126.

Reader 110 and tag 120 communicate via waves 112 and 126. While communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration symbol, and so on. Symbols can be implemented for exchanging binary data, such as "0" and "1" if desired. When the symbols are processed internally by reader 110 and tag 120 they can be treated as values, numbers, and so on.

Tag 120 can be a passive tag, or an active or battery-assisted tag (i.e., having its own power source). When tag 120 is a passive tag it is powered from wave 112.

Figure 2:
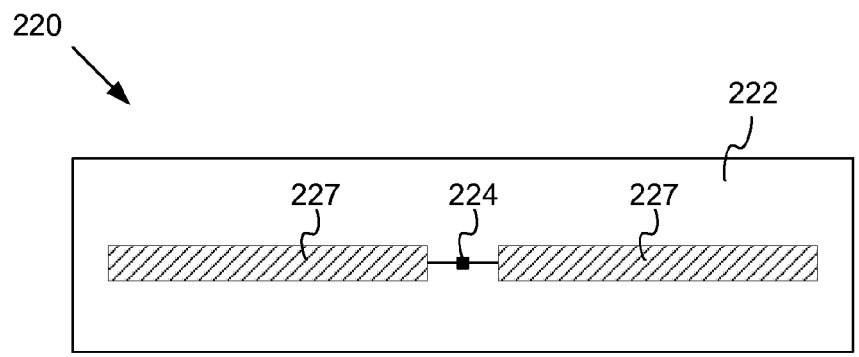
FIG. 2 is a diagram showing components of a passive RFID tag, such as a tag that can be used in the system of FIG. 1.

FIG. 2 is a diagram of an RFID tag 220, which may be similar to tag 120 of FIG. 1. Tag 220 is implemented as a passive tag, meaning it does not have its own power source. Much of what is described in this document, however, applies also to active and battery-assisted tags.

Tag 220 is formed on a substantially planar inlay 222, which can be made in many ways known in the art. Tag 220 includes an electrical circuit which is preferably implemented as an integrated circuit (IC) 224. In some embodiments, IC 224 may be implemented in complementary metal-oxide semiconductor (CMOS) technology. In other embodiments IC 224 may be implemented in other semiconductor technologies, such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable antenna contacts (not shown in FIG. 2).

IC 224 is shown with a single antenna port, comprising two antenna contacts electrically coupled to two antenna segments 227 which are shown here forming a dipole. Many other embodiments are possible using any number of ports, contacts, antennas, and/or antenna segments.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response wave 126 from wave 112 transmitted by the reader. Coupling and uncoupling the antenna terminals of IC 224 can modulate the antenna's reflectance, as can a variety of other means.

In the embodiment of FIG. 2, antenna segments 227 are separate from IC 224. In other embodiments, antenna segments may alternatively be formed on IC 224. Tag antennas according to embodiments may be designed in any form and are not limited to dipoles. For example, the tag antenna may be a patch, a slot, a loop, a coil, a horn, a spiral, or any other suitable antenna.

The components of the RFID system of FIG. 1 may communicate with each other in any number of modes. One such mode is called full duplex. Another such mode is called half-duplex, and is described below.

Figure 3:
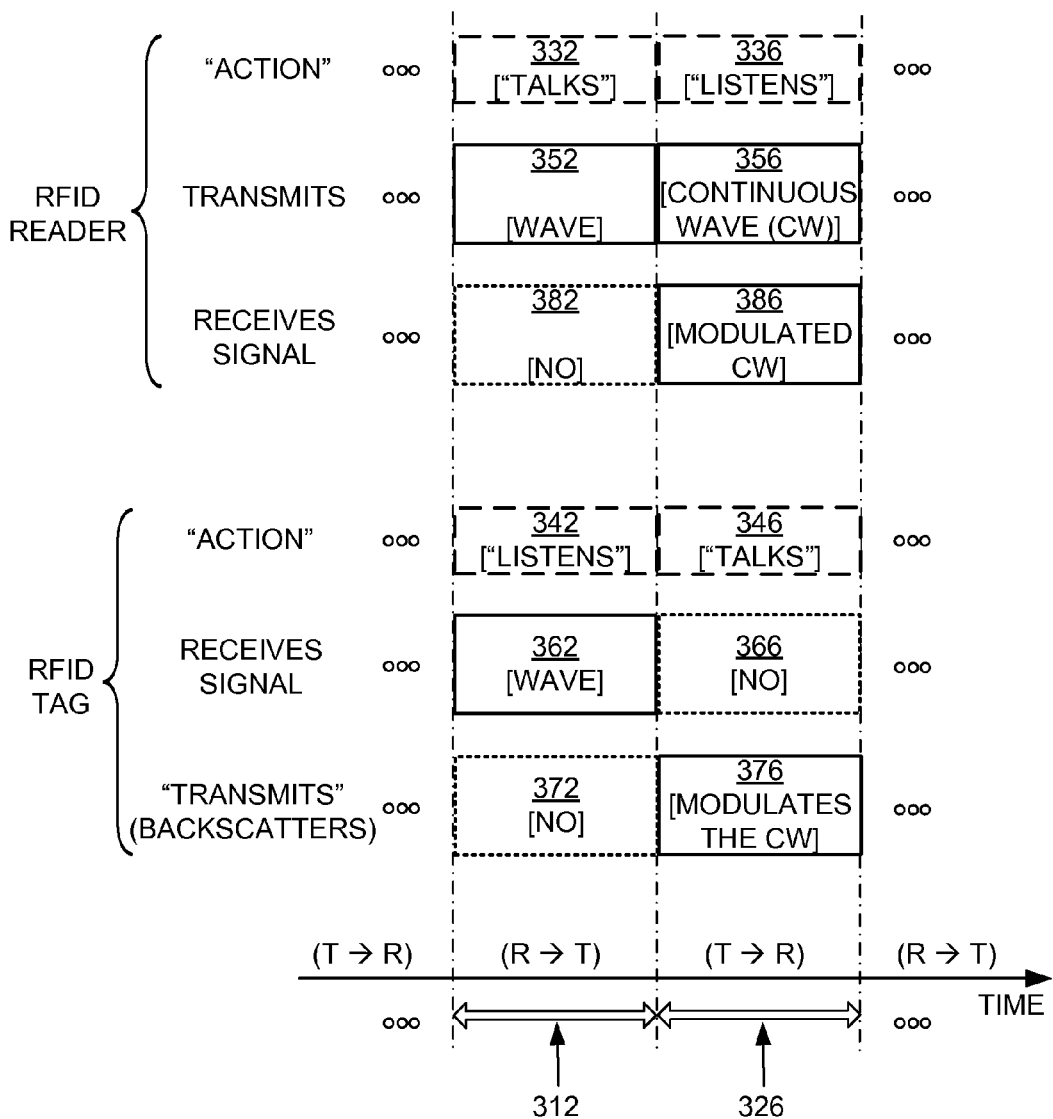
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in reference to FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that typically encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

An order, a timing, and other parameters of RFID tag/reader communications may be defined by industry and/or government protocols (also known as standards). For example, the Class-1 Generation-2 UHF RFID Protocol for Communications at 860 MHz-960 MHz ("Gen2 Specification") by EPCglobal, Inc. is one such industry standard. The contents of the Gen2 Specification version 1.2.0 are hereby incorporated by reference.

Figure 4:
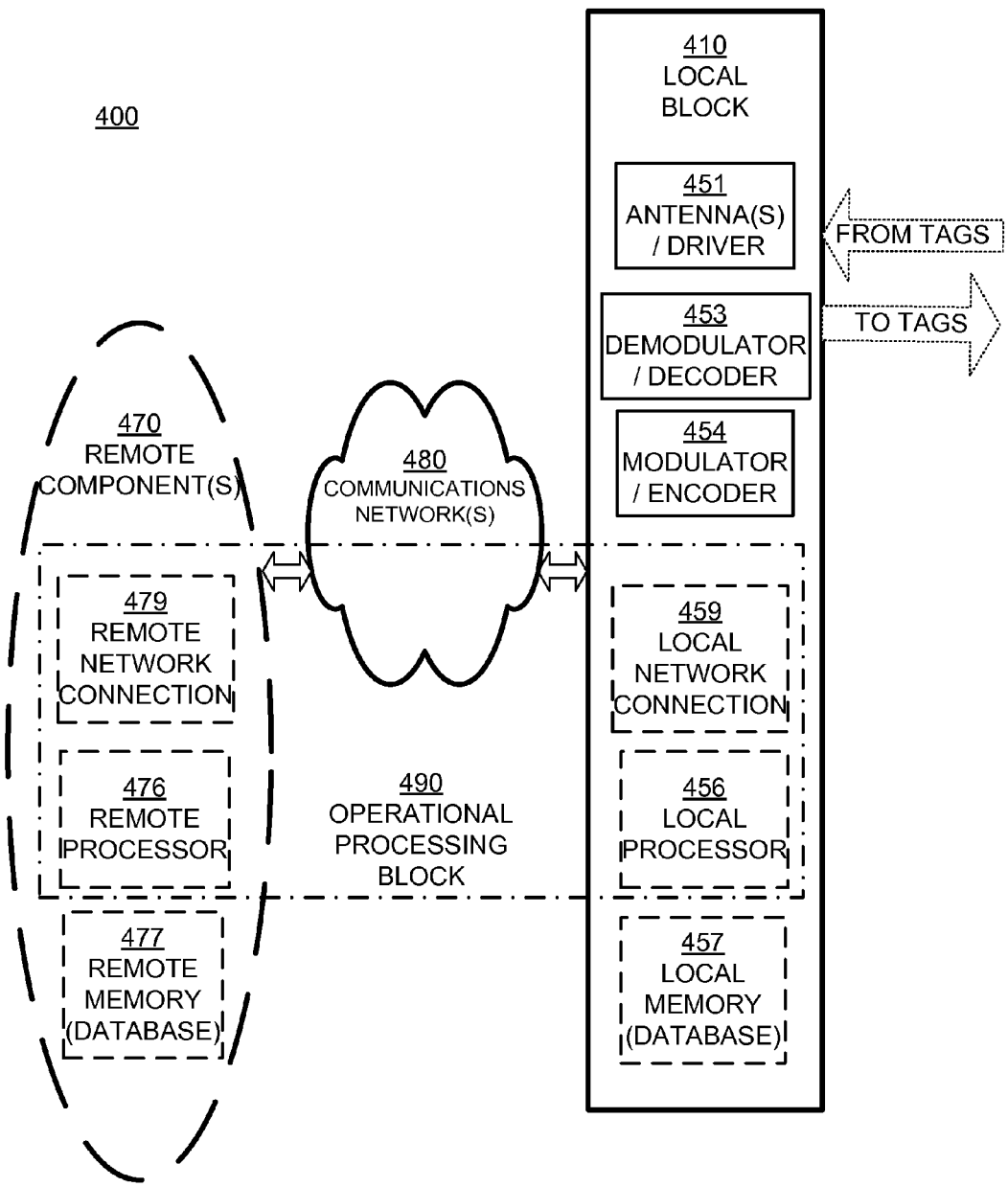
FIG. 4 is a block diagram showing a detail of an RFID reader, such as the one shown in FIG. 1.

FIG. 4 is a block diagram of an RFID reader system 400 according to embodiments. RFID reader system 400 includes a local block 410, and optionally remote components 470. Local block 410 and remote components 470 can be implemented in any number of ways. It will be recognized that RFID reader 110 of FIG. 1 is the same as local block 410, if remote components 470 are not provided. Alternately, RFID reader 110 can be implemented instead by RFID reader system 400, of which only the local block 410 is shown in FIG. 1.

Local block 410 is responsible for communicating with the tags. Local block 410 includes a block 451 having an antenna and an antenna driver for communicating with the tags. Some readers, like that shown in local block 410, contain a single antenna and driver. Some readers contain multiple antennas and drivers and are capable of switching signals among them, including sometimes using different antennas for transmitting and for receiving. Some readers contain multiple antennas and drivers that can operate simultaneously. A demodulator/decoder block 453 demodulates and decodes backscattered signals received from the tags via antenna/driver block 451. Modulator/encoder block 454 encodes and modulates an RF signal that is to be transmitted to the tags via antenna/driver block 451.

In typical embodiments demodulator/decoder block 453 and modulator/encoder block 454 are operable to demodulate and modulate signals according to a protocol, such as the Gen2 Specification mentioned above. In embodiments where multiple demodulators and/or multiple modulators are present, each may be configured to support different protocols or different sets of protocols. A protocol specifies, in part, how symbols are encoded for communication, and may include modulations, encodings, rates, timings, or any other parameters associated with data communications.

Local block 410 additionally includes an optional local processor 456. Local processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 453, the encoding function in block 454, or both, may be performed instead by local processor 456. In some cases local processor 456 may implement an encryption or authentication function; in some cases one or more of these functions can be distributed among other blocks such as encoding block 454, or may be entirely incorporated in another block.

Local block 410 additionally includes an optional local memory 457. Local memory 457 may be implemented in any number of ways known in the art. Such ways include, by way of examples and not of limitation, nonvolatile memories (NVM), read-only memories (ROM), random access memories (RAM), any combination of one or more of these, and so on. These memories can be implemented separately from local processor 456, or in a single chip with local processor 456, with or without other components. Local memory 457, if provided, can store programs for local processor 456 to run, if needed.

In some embodiments, local memory 457 stores data read from tags, or data to be written to tags, such as Electronic Product Codes (EPCs), Tag Identifiers (TIDs) and other data. Local memory 457 can also include reference data that is to be compared to the EPC codes, instructions and/or rules for how to encode commands for the tags, modes for controlling antenna 451, secret keys, key pairs, and so on. In some of these embodiments, local memory 457 is provided as a database.

Some components of local block 410 typically treat the data as analog, such as the antenna/driver block 451. Other components such as local memory 457 typically treat the data as digital. At some point there is a conversion between analog and digital. Based on where this conversion occurs, a reader may be characterized as "analog" or "digital", but most readers contain a mix of analog and digital functionality.

If remote components 470 are indeed provided, they are coupled to local block 410 via an electronic communications network 480. Network 480 can be a Local Area Network (LAN), a Metropolitan Area Network (MAN), a Wide Area Network (WAN), a network of networks such as the internet, or a local communication link, such as a USB, PCI, and so on. In turn, local block 410 then includes a local network connection 459 for communicating with communications network 480. Communications on the network can be secure, such as if they are encrypted or physically protected, or insecure if they are not encrypted or otherwise protected.

There can be one or more remote component(s) 470. If there are more than one, they can be located at the same location, or in different locations. They can access each other and local block 410 via communications network 480, or via other similar networks, and so on. Accordingly, remote component(s) 470 can use respective remote network connections. Only one such remote network connection 479 is shown, which is similar to local network connection 459, etc.

Remote component(s) 470 can also include a remote processor 476. Remote processor 476 can be made in any way known in the art, such as was described with reference to local processor 456. Remote processor 476 may also implement an authentication function, similar to local processor 456.

Remote component(s) 470 can also include a remote memory 477. Remote memory 477 can be made in any way known in the art, such as was described with reference to local memory 457. Remote memory 477 may include a local database, and a remote database of a Standards Organization, such as one that can reference EPCs. Remote memory 477 may also contain information associated with command, tag profiles, keys, or the like, similar to local memory 457.

Of the above-described elements, it may be advantageous to consider a combination of these components, designated as operational processing block 490. Operational processing block 490 includes the following components, if present: local processor 456, remote processor 476, local network connection 459, remote network connection 479, and by extension an applicable portion of communications network 480 that links remote network connection 479 with local network connection 459, which may be dynamically changeable. In addition, operational processing block 490 can receive and decode RF waves received via antenna 451, and cause antenna 451 to transmit RF waves according to what it has processed.

Operational processing block 490 includes local processor 456 and/or remote processor 476. If both are provided, remote processor 476 can be made such that it operates in a way complementary with that of local processor 456. In fact, the two can cooperate. It will be appreciated that operational processing block 490, as defined this way, is in communication with both local memory 457 and remote memory 477, if both are present.

Accordingly, operational processing block 490 is location independent, in that its functions can be implemented either by local processor 456, or by remote processor 476, or by a combination of both. Some of these functions are preferably implemented by local processor 456, and some by remote processor 476. Operational processing block 490 accesses local memory 457, or remote memory 477, or both for storing and/or retrieving data.

RFID reader system 400 operates by operational processing block 490 generating communications for RFID tags. These communications are ultimately transmitted by antenna block 451, with modulator/encoder block 454 encoding and modulating the information on an RF wave. Then data is received from the tags via antenna block 451, demodulated and decoded by demodulator/decoder block 453, and processed by processing operational processing block 490.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described, together with the RFID tag as an additional module.

Figure 5:
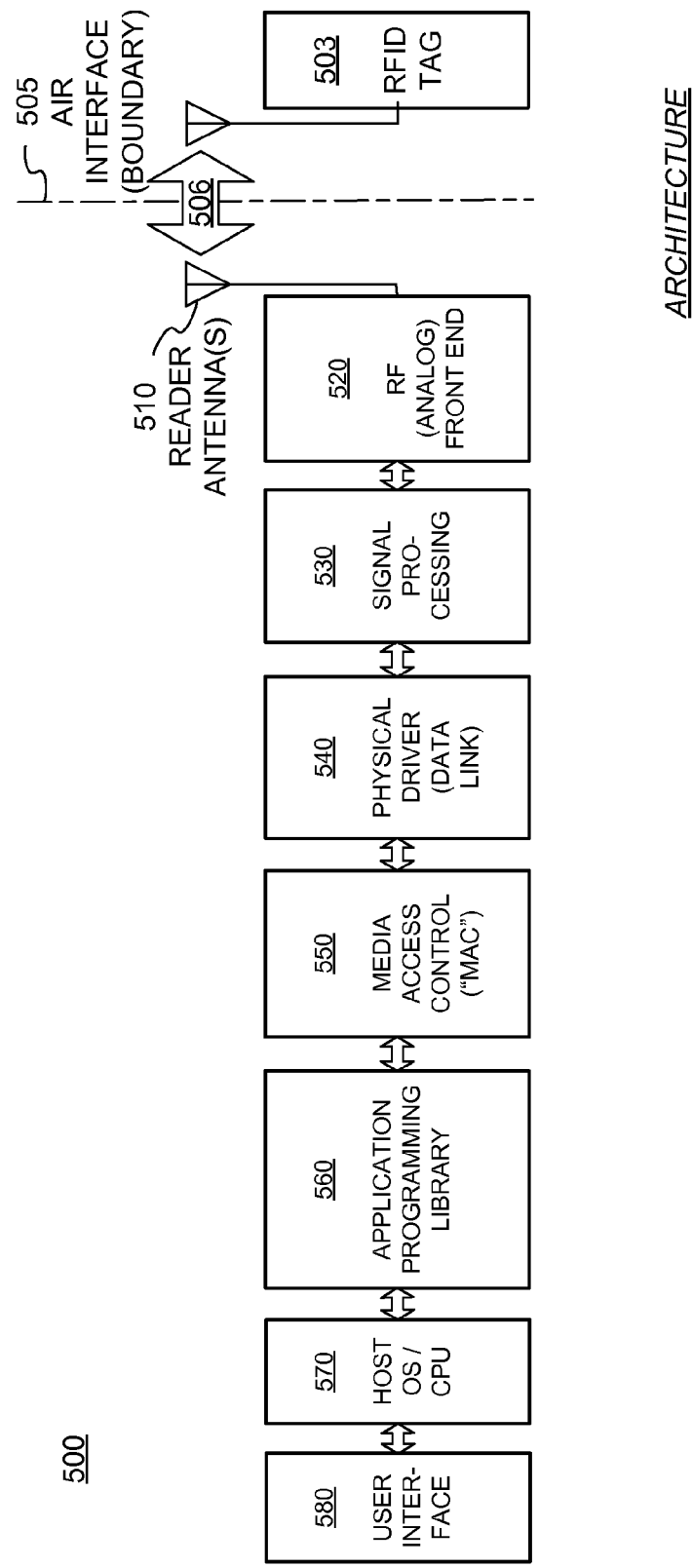

FIG. 5 is a block diagram illustrating an overall architecture of an RFID reader 500 according to embodiments. It will be appreciated that RFID reader 500 is considered subdivided into modules or components. Each of these modules may be implemented by itself, or in combination with others. In addition, some of them may be present more than once. Other embodiments may be equivalently subdivided into different modules. It will be recognized that some aspects are parallel with what was described previously.

An RFID tag 503 is considered here as a module by itself. RFID tag 503 conducts a wireless communication 506 with other modules or components, via an air interface 505. It is noteworthy that air interface 505 is really only a boundary, in that signals or data that pass through it are not intended to be transformed from one thing to another. Specifications as to how readers and tags are to communicate with each other, for example the Gen2 Specification, also properly characterize that boundary as an interface.

RFID system 500 includes one or more reader antennas 510, and an RF front-end module 520 for interfacing with reader antenna(s) 510. These can be made as described above.

RFID system 500 also includes a signal-processing module 530. In one embodiment, signal-processing module 530 exchanges signals with RF front-end module 520, such as I and Q signal pairs.

RFID system 500 also includes a physical-driver module 540, which is also known as data-link module. In some embodiments physical-driver module 540 exchanges data with signal-processing module 530. Physical-driver module 540 can be the stage associated with the framing of data.

RFID system 500 additionally includes a media access control module 550, which is also known as a MAC layer module. In one embodiment, MAC layer module 550 exchanges data with physical driver module 540. MAC layer module 550 can make decisions for sharing the wireless communication medium, which in this case is the air interface.

RFID system 500 moreover includes an application-programming library-module 560. This module 560 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 570. In some embodiments, the processor is not considered a separate module, but rather as one that includes some of the above-mentioned modules of RFID system 500. In some embodiments the one or more processors perform operations associated with retrieving data that may include a tag public key, an electronic signature, a tag identifier, an item identifier, and a signing-authority public key. In some embodiments the one or more processors verify an electronic signature, create a tag challenge, and verify a tag response.

User interface module 580 may be coupled to application-programming-library module 560, for accessing the APIs. User interface module 580 can be manual, automatic, or both. It can be supported by the host OS/CPU module 570 mentioned above, or by a separate processor, etc.

It will be observed that the modules of RFID system 500 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for transmitting RFID signals and in the other direction for receiving RFID signals. In transmitting mode, signal initiation can be in any one of the modules. Ultimately, signals are routed to reader antenna(s) 510 to be transmitted as wireless RF signals. In receiving mode, reader antenna(s) 510 receives wireless RF signals, which are in turn processed successively by the various modules in the chain. Processing can terminate in any one of the modules.

The architecture of RFID system 500 is presented for purposes of explanation, and not of limitation. Its particular, subdivision into modules need not be followed for creating embodiments. Furthermore, the features of the present disclosure can be performed either within a single one of the modules, or by a combination of modules.

As mentioned previously, embodiments are directed to a synthesized-beam antenna transceiver system that can compensate for beam gain degradation due to undesired coupling with radiation pattern side lobes and/or floating antenna elements. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments further include storage media. Such media, individually or in combination with others, have stored thereon instructions, data, keys, signatures, and other data of a program made according to embodiments. A storage medium according to embodiments is a computer-readable medium, such as a memory, and is read by a processor of the type mentioned above. If the storage medium is a memory, it can be implemented in a number of ways, such as Read Only Memory (ROM), Random Access Memory (RAM), etc., some of which are volatile and some nonvolatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

FIG. 6 is a block diagram illustrating an architecture 600 for an interface converter according to embodiments. Architecture 600 includes a utility 640, which is a mechanism for performing some or all of the reader features described above.

More particularly, utility 640 may cause a tag to store one or more received instructions in its memory, execute the instructions in response to a subsequent command or trigger event, and respond differently to a reader command based on results generated by executing the instructions.

Architecture 600 additionally includes an interface converter 650 and an agent 660. Embodiments also include methods of operation of interface converter 650. Interface converter 650 enables agent 660 to control utility 640. Interface converter 650 is so named because it performs a conversion or a change, as will be described in more detail below. Agent 660, interface converter 650, and utility 640 can be implemented in any way known in the art. For example, each can be implemented in hardware, middleware, firmware, software, or any combination thereof. In some embodiments, agent 660 is a human.

Between interface converter 650, agent 660 and utility 640 there are respective boundaries 655 and 645. Boundaries 655 and 645 are properly called interfaces, in that they are pure boundaries, similar to the above described air interface.

In addition, it is a sometimes informal usage to call the space between boundaries 655 and 645, which includes interface converter 650, an "interface" 656. Further, it is common to designate this space with a double arrow as shown, with an understanding that operations take place within the arrow. So, although "interface" 656 is located at a boundary between agent 660 and utility 640, it is not itself a pure boundary. Regardless, the usage of "interface" 656 is so common for interface converter 650 that this document sometimes also refers to it as an interface. It is clear that embodiments of such an "interface" 656 can be included in this invention, if they include an interface converter that converts or alters one type of transmission or data to another, as will be seen below.

Agent 660 can be one or more layers in an architecture. For example, agent 660 can be something that a programmer programs. In alternative embodiments, where agent 660 is a human, interface converter 650 can include a screen, a keyboard, or any other user interface.

FIG. 7 is a sample screenshot 750 associated with an interface for an interface converter, such as the interface converter 650 of FIG. 6. Screenshot 750 can be that of a computer screen for a human agent, according to an embodiment. What is displayed in screenshot 750 exposes the functionality of a utility, such as utility 640. Inputs by the user via a keyboard, a mouse, etc., can ultimately control utility 640. Accordingly, such inputs are received in the context of screenshot 750. These inputs are determined from what is needed for controlling and operating utility 640. An advantage with such interfacing is that agent 660 can prepare RFID applications at a higher level, without needing to know how to control lower level RFID operations. Such lower level RFID operations can be as described in the Gen2 Specification, in cryptographic algorithms, in other lower level protocols, etc. Utility 640 can be controlled in any number of ways. Some such ways are now described.

Returning to FIG. 6, one way interface converter 650 can be implemented is as a software Application Programming Interface (API). This API can, for example, control or provide inputs to an underlying software library.

Communications can be made between agent 660, interface converter 650, and utility 640. Such communications can be as input or can be converted, using appropriate protocols, etc. These communications can encode commands, data, etc., and can include any one or a combination of the following: a high-down communication HDNT from agent 660 to interface converter 650; a low-down communication LDNT from interface converter 650 to utility 640; a low-up communication LUPT from utility 640 to interface converter 650; and a high-up communication HUPT from interface converter 650 to agent 660. These communications can be spontaneous, or in response to another communication, or in response to an input or an interrupt, etc.

Commands are more usually included in communications HDNT and LDNT, for ultimately controlling utility 640. Controlling can be in a number of manners. One such manner can be to install utility 640, or just a feature of it. Such installing can be by spawning, downloading, etc. Other such manners can be to configure, enable, disable, or operate utility 640, or just a feature of it. These commands can be standalone, or can carry parameters, such as data, instructions to be stored by tags, etc. In some embodiments interface converter 650 can convert these commands to a format suitable for utility 640.

Data is more usually included in communications HUPT and LUPT. The data can inform as to success or failure of executing an operation. The data can also include tag data, which can be both codes read from tags and data about reading tags (such as time stamps, date stamps, etc.). In some embodiments interface converter 650 can convert the data to a format suitable for agent 660, including in some cases aggregating, filtering, merging, or otherwise altering the format or utility of the data.

It should be noted that what passes across a single pure boundary is unchanged (by the mere definition of a pure boundary). But what passes through interface converter 650 can be changed or not. More particularly, high-down communication HDNT can be encoded similarly to, or differently from, low-down communication LDNT. In addition, low-up communication LUPT can be encoded similarly to, or differently from, high-up communication HUPT. When encodings are different, the difference can be attributed to interface converter 650, which performs a suitable change, or conversion, of one communication to another. The change, or conversion, performed by interface converter 650 is for exposing the functionality of utility 640 to agent 660, and vice versa. In some embodiments, a command is converted, but a parameter is passed along without being converted. What is not converted at one module may be converted at another. Such modules taken together can also form an interface converter according to embodiments.

Figure 8:
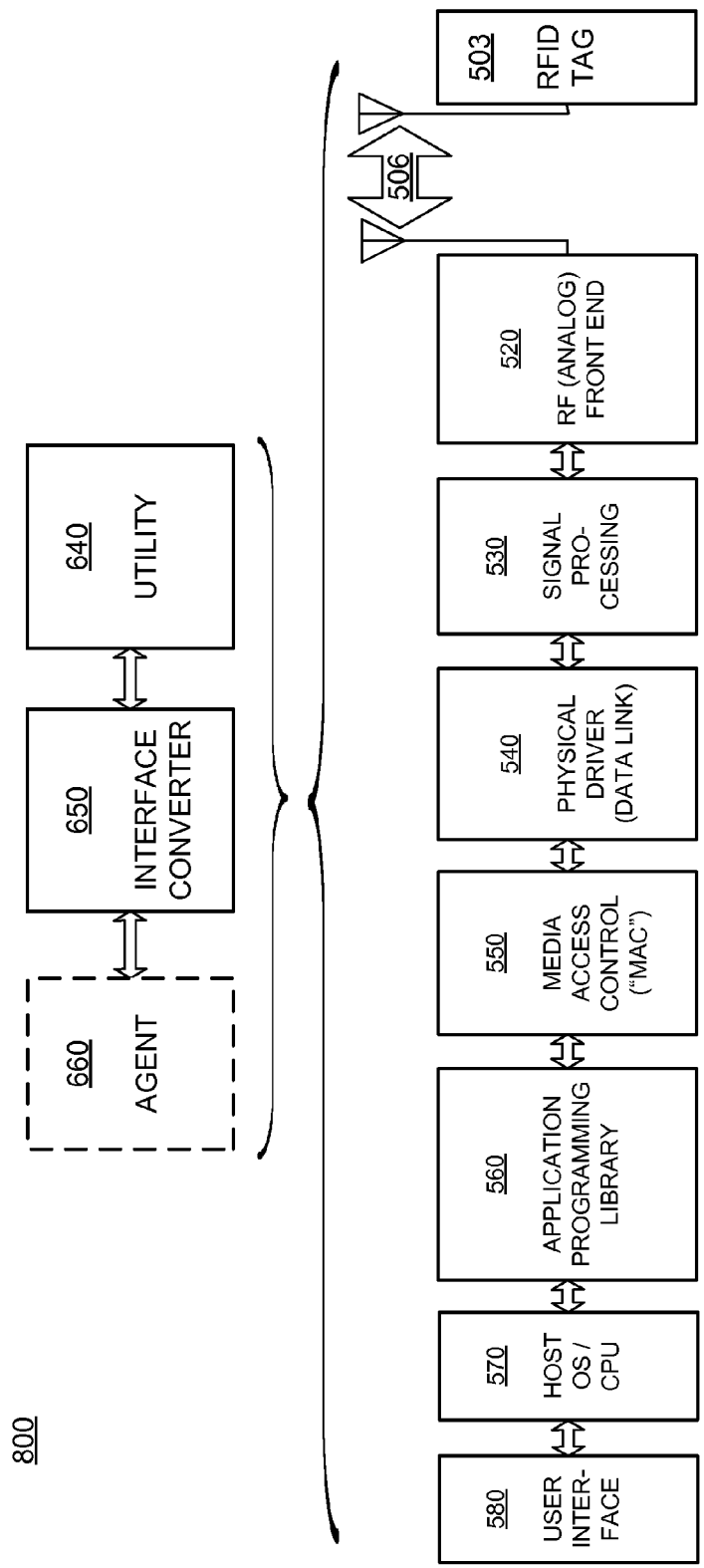

Agent 660, interface converter 650, and utility 640 can be implemented as part of a reader, or as a different device. When implemented as part of a reader, FIG. 8 suggests a scheme 800 where agent 660, interface converter 650, and utility 640 can be implemented in connection with respective reader modules that are suitable, depending on the requirements.

Figure 9:
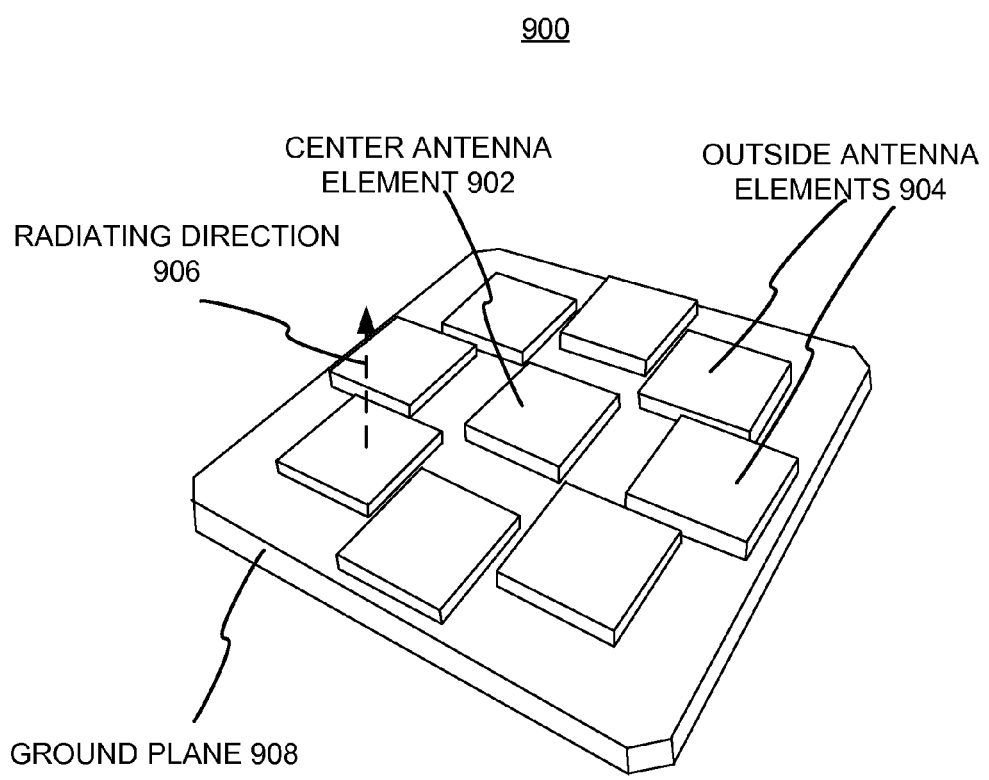
FIG. 9 depicts a synthesized-beam antenna according to embodiments.

FIG. 9 depicts a perspective view of a synthesized-beam antenna (SBA) 900 according to embodiments. SBA 900 includes an array of multiple antenna elements 902 and 904 arranged along an antenna plane, and an antenna ground plane 908 that lies behind the antenna elements 902 and 904. Each antenna element has a radiating direction vector 906 (only shown for one antenna element) that is perpendicular to the antenna plane. An RF radiation pattern (or "beam") for receiving or transmitting an RF signal can be synthesized by driving or activating one or more of the antenna elements 902 and 904. The direction of the synthesized RF beam (represented by the direction of the beam's primary lobe—the lobe having the highest radiated power) can be controlled by selecting the particular antenna elements that are activated and the particular waveforms used to drive those elements. An antenna element is activated or driven when it is electrically connected to an RF input or output (e.g., a transmitter output, a receive input, a transceiver input/output, or any suitable RF component). For example, an antenna element is activated/driven if it is used to transmit or receive a signal.

Two components are said to be electrically connected when a low-impedance path exists between them, and are said to be disconnected if no such low-impedance path exists. Of course, electrically disconnected components will generally have some unavoidable stray capacitive or inductive coupling between them, but the intent of the disconnection is to minimize this stray coupling to a negligible level when compared with an electrically connected path. In some embodiments, antenna elements include one or more of patch antennas, slot antennas, wire antennas, horn antennas, and helical antennas. While SBA 900 only includes nine antenna elements, antenna arrays with any number of antenna elements may be used. Also, in some embodiments the antenna ground plane 908 may actually be a surface that is at least partly nonplanar (e.g., curved, concave, convex, etc.).

Figure 10A:
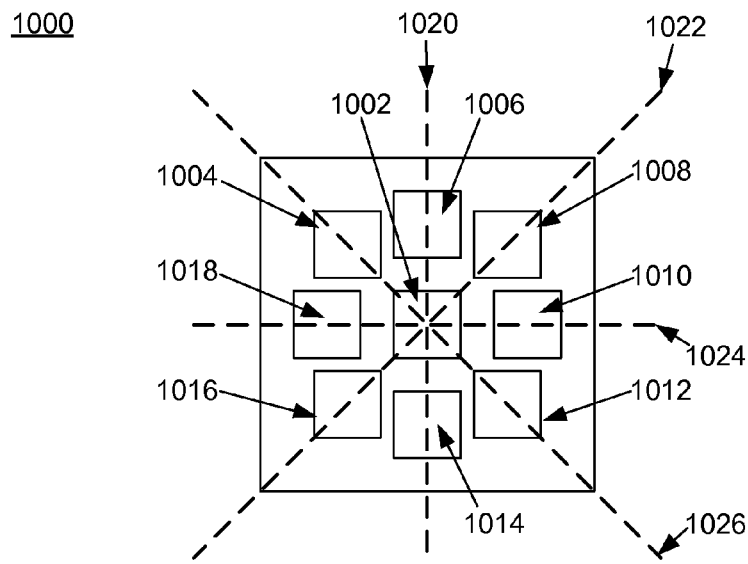
FIGS. 10A and 10B depict potential beams that can be formed by the synthesized-beam antenna of FIG. 9, according to embodiments.
Figure 10B:
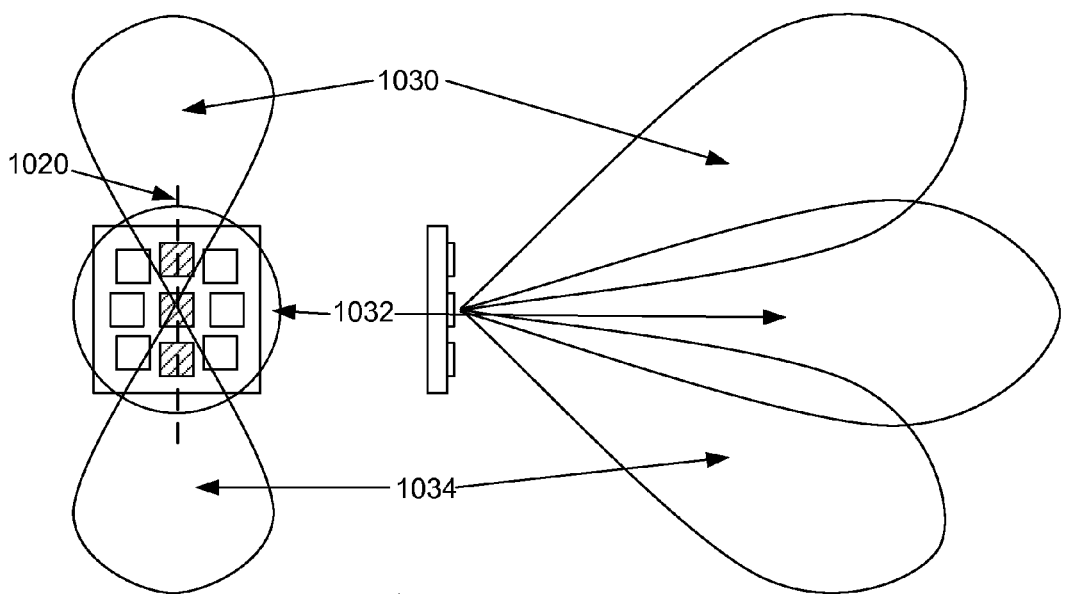

FIGS. 10A and 10B depict the directions of potential RF beams that can be synthesized by an SBA 1000 similar to SBA 900 in FIG. 9. SBA 1000 has nine antenna elements 1002-1018, with element 1002 residing at the center and elements 1004-1018 positioned around it. If two or more antenna elements arranged in a line are activated to synthesize an RF beam, the synthesized beam can be steered (i.e., its direction can be controlled or changed) along a plane that includes both the radiating direction vectors for the individual antenna elements and the line the antenna elements are arranged in. For example, if antenna elements 1002, 1004, and 1012 are activated, an RF beam can be synthesized and steered along a plane 1026 that includes the radiating direction vectors for antenna elements 1002, 1004, and 1012 and the line between the elements. Similarly, the RF beam synthesized by driving elements 1002, 1006, and 1014 can be steered along plane 1020; the beam synthesized by elements 1002, 1008, and 1016 can be steered along plane 1022; and the beam synthesized by elements 1002, 1010, and 1018 can be steered along plane 1024.

FIG. 10B shows how an RF beam synthesized by activating antenna elements located along plane 1020 can be steered, with the diagram to the left depicting a head-on view similar to FIG. 10A and the diagram to the right depicting a side view. The direction of a synthesized beam can be controlled by varying the amount of phase-shifting that is applied to the waveforms supplied to the activated antenna elements. When all three elements are driven with the same waveform, an RF beam 1032 is synthesized with a direction parallel to the radiating direction vectors of the individual antenna elements. If the waveforms supplied to the top element (e.g., element 1006 in FIG. 10A) and the bottom element (e.g., element 1014 in FIG. 10A) are phase-shifted to lag behind and lead, respectively, the waveform supplied to the middle element (e.g., element 1002 in FIG. 10A), RF beam 1030 can be synthesized, pointing upward with respect to beam 1032. Similarly, if the phase-shifting is reversed (i.e., the top element receives the leading waveform and the bottom element receives the lagging waveform), RF beam 1034 can be synthesized, pointing downward with respect to beam 1032. Synthesized beam direction may also be controlled by adjusting the relative amplitudes of the waveforms supplied to the different antenna elements.

While FIG. 10B describes RF beams synthesized by antenna elements arranged in a single line (or plane), in some embodiments one or more additional antenna elements may be activated to synthesize an RF beam. For example, an RF beam may be synthesized by activating antenna elements located along plane 1020 as well as antenna elements 1010 and/or 1018, which are not located along plane 1020. Activating these additional antenna elements may allow for additional RF beam shaping, for example to narrow the synthesized RF beam.

Figure 11:
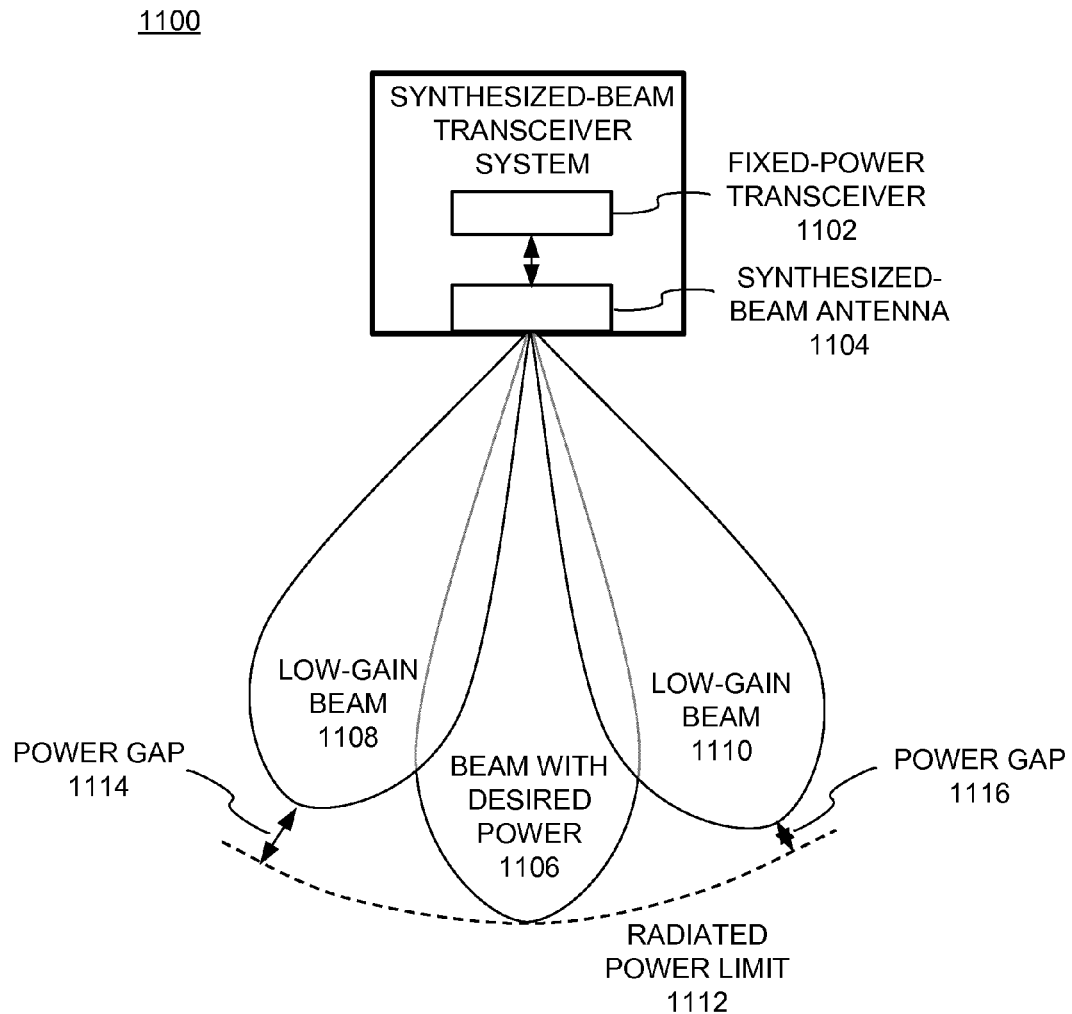
FIG. 11 depicts a synthesized-beam transceiver system with a fixed-power transceiver according to embodiments.

FIG. 11 depicts a synthesized-beam transceiver system 1100 with a fixed-power transceiver 1102, which in some embodiments may be similar to RFID reader 110 (FIG. 1), and a synthesized-beam antenna 1104 similar to SBA 1000 in FIG. 10. Fixed-power transceiver 1102 supplies conducted power in the form of phase-shifted and unshifted waveforms to activated antenna elements in the synthesized-beam antenna 1104 in order to synthesize an RF beam. Generally, the fixed-power transceiver 1102 is calibrated to cause the synthesized beam antenna 1104 to synthesize an RF beam 1106 with a particular desired peak radiated power. In embodiments where the transceiver system is an RFID reader system, the tag read/write capabilities of a reader are directly related to the radiated power of the RF beam. Therefore, synthesized RF beams with power near or at the maximum allowed radiated power limit 1112 may be desirable. However, as the synthesized RF beam is steered to point away from the antenna element direction vectors (which are oriented vertically downward in the case of FIG. 11), the beam power decreases due to the finite beamwidth of the antenna elements. This results in undesirable power gaps 1114/1116 between the low-gain, off-axis synthesized beams 1108 and 1110 and the radiated power limit 1112, resulting in reduced tag read/write capabilities.

Figure 12:
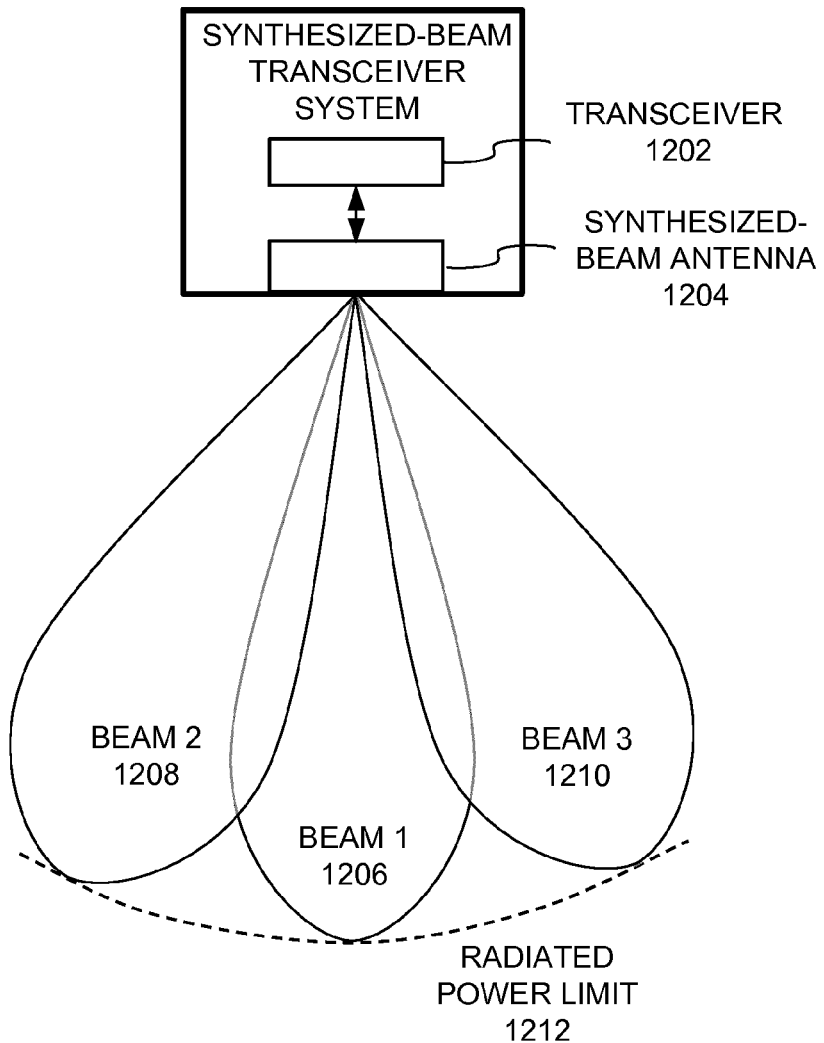
FIG. 12 depicts a synthesized-beam transceiver system capable of compensating for beam gain variations according to embodiments.

FIG. 12 depicts a synthesized-beam transceiver system 1200 capable of compensating for beam gain variations according to embodiments. The transceiver system 1200 includes a compensating variable-power transceiver 1202 coupled to a synthesized-beam antenna 1204, similar to antenna 1104 (FIG. 11) and SBA 1000 (FIG. 10). As with the fixed-power transceiver system 1100 described in FIG. 11, RF beam 1206 (analogous to beam 1106 in FIG. 11) can be synthesized with a desired power near or at the radiated power limit 1212. However, in contrast to the fixed-power transceiver 1102 in transceiver system 1100, the compensating variable-power transceiver 1202 in system 1200 can compensate for power losses in off-axis beams by varying the conducted power supplied to the synthesized beam antenna 1204. Therefore, the system 1200 can synthesize compensated off-axis beams 1208 and 1210 such that power gaps are reduced, if not eliminated.

Figure 13:
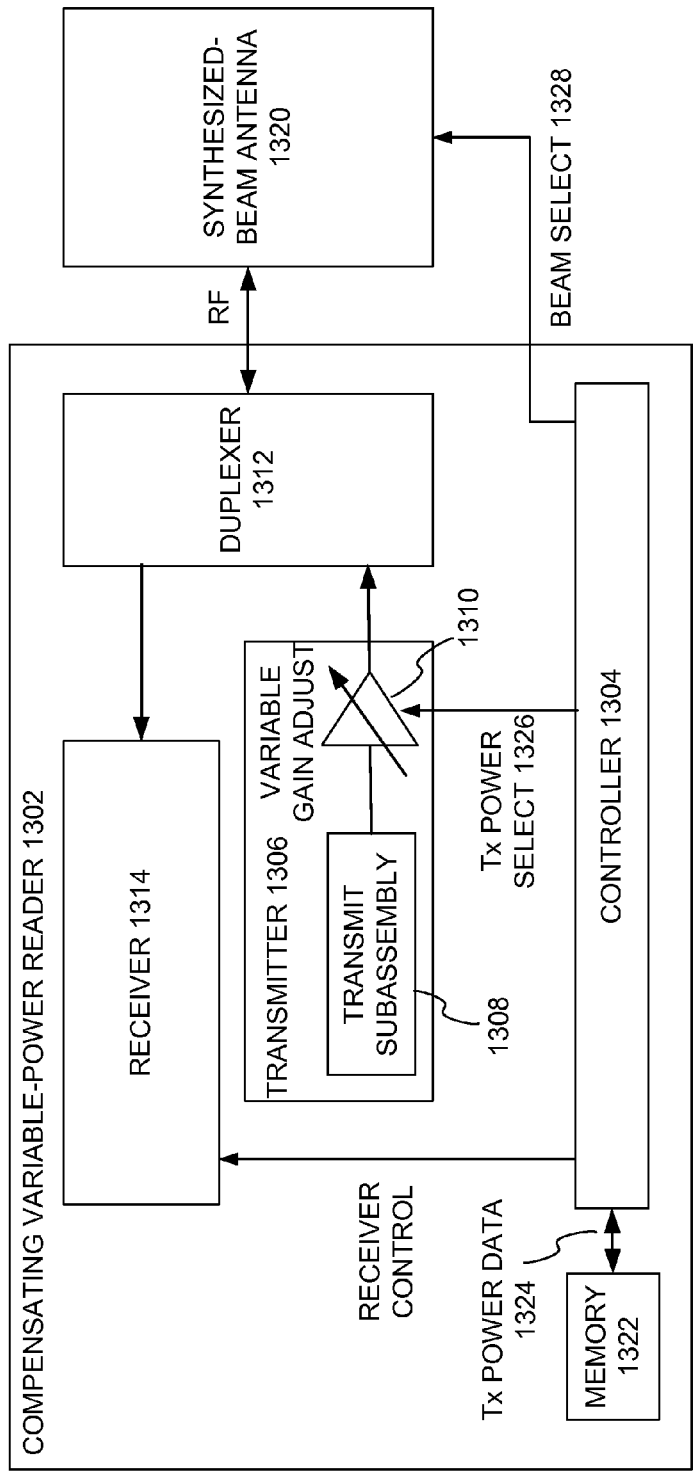
FIG. 13 is a block diagram of an RFID synthesized-beam reader system according to one embodiment.

In some embodiments, transceiver system 1200 may be an RFID reader system, although the synthesized-beam gain compensation techniques described herein may be used in non-RFID applications. FIG. 13 is a block diagram of such an RFID synthesized-beam reader system 1300 according to one embodiment. Reader system 1300 includes a compensating variable-power reader 1302 and a synthesized-beam antenna 1320, similar to transceiver 1202 and antenna 1204 in FIG. 12, respectively. Reader 1302 includes a controller 1304, a transmitter 1306 (which itself includes a transmit subassembly 1308 and a variable gain adjust 1310), a receiver 1314, a duplexer 1312 (which allows the reader 1302 to both transmit and receive), and a memory 1322. Controller 1304, which may include one or more processors, is configured to cause reader system 1300 to synthesize RF beams and to adjust the conducted power output by reader 1302 in order to compensate for beam gain variations. In some embodiments, controller 1304 adjusts the reader output power based on transmit power settings (e.g., transmit power data 1324) stored in memory 1322.

Transmit power data 1324 may include settings for transmitter 1306, variable gain adjust 1310, receiver 1314, and/or synthesized-beam antenna 1320. In particular, transmit power data 1324 may indicate the appropriate settings for variable gain adjust 1310 and/or receiver 1314 for particular RF beam orientations in order to achieve a desired beam power. Transmit power data 1324 may be pre-stored in memory 1322 (e.g., as a result of testing and calibration at the time of manufacture/testing), or may be dynamically stored or updated by controller 1304 during operation of reader system 1300.

For example, when synthesizing an RF beam, controller 1304 may transmit a beam select signal 1328 to synthesized-beam antenna 1320 to activate or drive the particular antenna elements in antenna 1320 used to synthesize the beam. Controller 1304 may also retrieve transmit power data 1324 that corresponds to the desired RF beam orientation from memory 1322, determine a transmit power select signal 1326 from the retrieved transmit power data 1324, and then adjust variable gain adjust 1310 based on the determined transmit power select signal 1326. In some embodiments, controller 1304 also adjusts receiver 1314 based on the retrieved transmit power data 1324. Controller 1304 may also adjust one or more of an amplifier gain, an amplifier bias, a digital-to-analog converter (DAC) gain, and a DAC input in order to adjust the conducted power.

Figure 14:
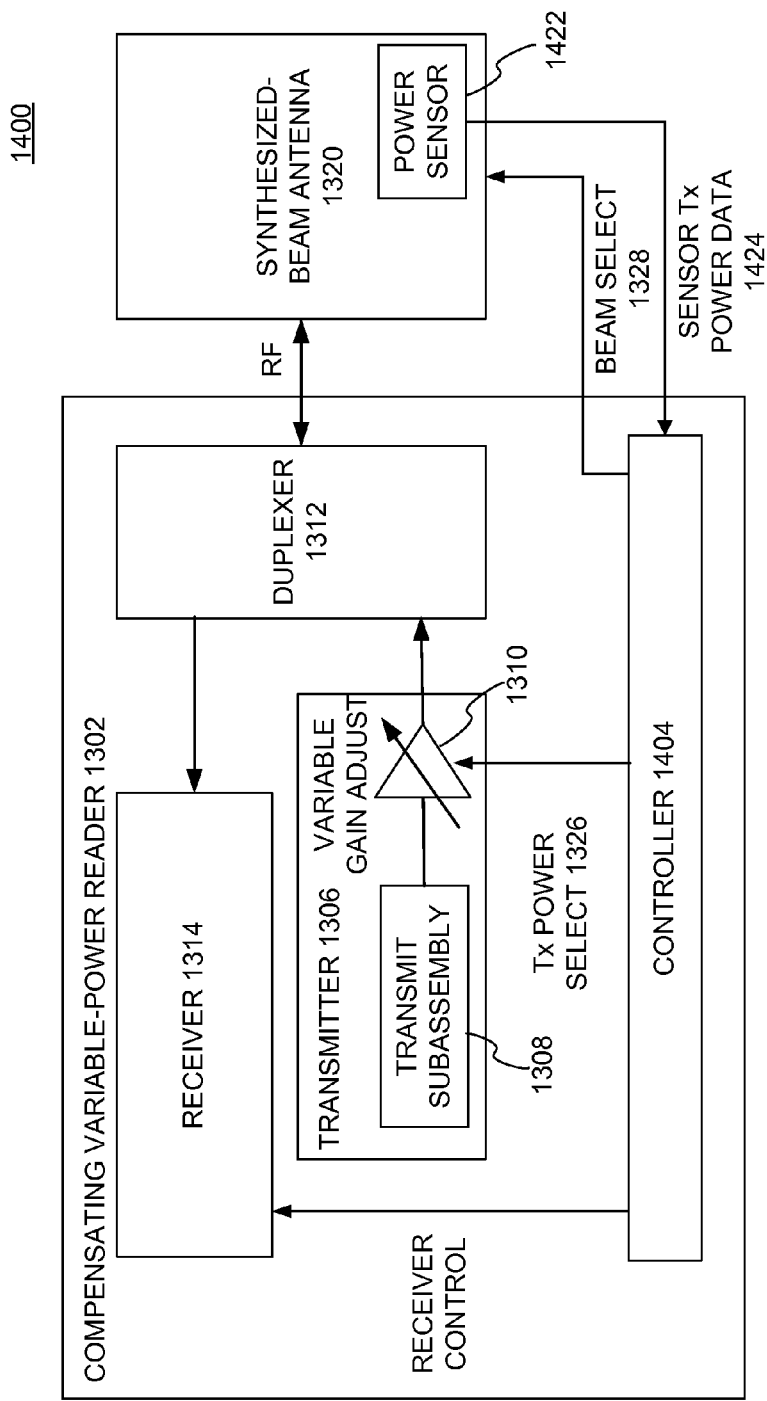
FIG. 14 is a block diagram of an RFID synthesized-beam reader system according to another embodiment.

FIG. 14 is a block diagram of an RFID synthesized-beam reader system 1400 according to another embodiment. Reader system 1400 is similar to reader system 1300 described in FIG. 13, with similarly-numbered elements operating similarly. Controller 1404 is similar to controller 1304 in that it is configured to cause reader system 1400 to synthesize RF beams, and to control the output power of reader 1402 in order to compensate for beam gain variations. However, controller 1404 directly receives sensed beam power data (sensor transmission power data 1424) from a power sensor 1422 associated with synthesized beam antenna 1320. Based on the received sensor transmission power data, controller 1404 then determines and adjusts settings for variable gain adjust 1310 and/or receiver 1314 that result in the desired beam power.

While reader systems 1300 and 1400 control reader output power based on information received from different components of the system (e.g., receiving data from memory 1322 or power sensor 1422), in some embodiments a reader system may include both a memory similar to memory 1322 and a power sensor similar to power sensor 1422. Transmit power data may be pre-stored in the memory, for example at the time of manufacture or testing, and a controller similar to controllers 1304/1404 may use the stored transmit power data to adjust the reader system transmitter/receiver initially. The controller may then use sensed transmit power data from the power sensor to further adjust the transmitter/receiver, and then may update the transmit power data stored in the memory with data received from the power sensor. In some embodiments, the reader system may receive power data from an external device or location. For example, the reader system may retrieve transmit power data from a remote location, such as a server, that is remotely accessible by the reader via, e.g., one or more networks. In some embodiments, the reader system may receive sensed power data from external devices (e.g., an RFID tag, a different reader, an external sensor, etc.).

Figure 15:
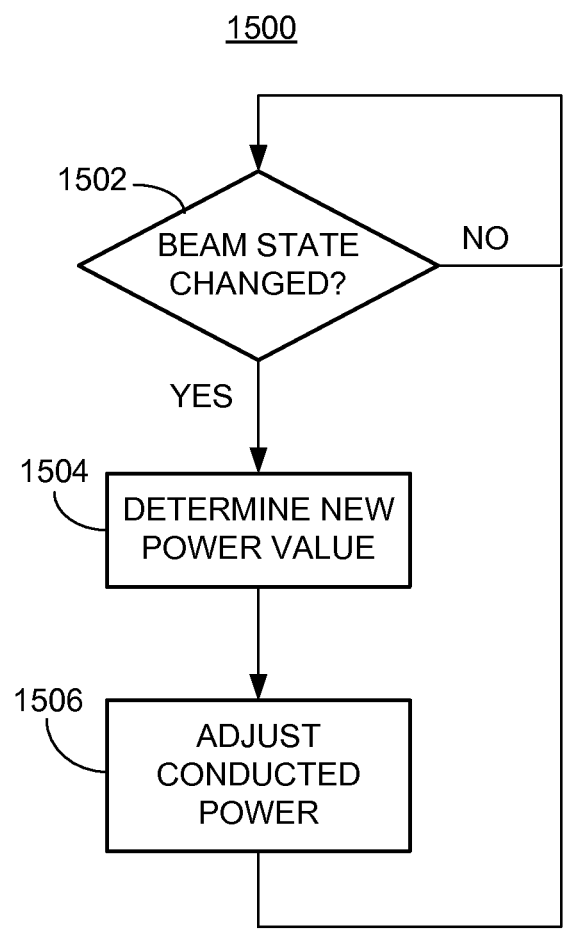
FIG. 15 is a flowchart depicting a synthesized-beam gain compensation process according to embodiments.

FIG. 15 is a flowchart depicting a synthesized-beam gain compensation process 1500 according to embodiments. Process 1500 begins at step 1502, where a transceiver controller (e.g., reader controller 1304/1404) determines if the state of a synthesized RF beam for transmitting or receiving an RF signal has changed. For example, the transceiver system may have been commanded to synthesize an RF beam, or it may have been commanded to change the orientation of a synthesized beam. A beam state change may also include a change in expected beam power. For example, the transceiver controller may determine that beam power is lower or higher than desired based on sensed transmit power data (e.g., from power sensor 1422).

If there is no beam state change, then process 1500 loops back to step 1502. If there is a beam state change, then process 1500 moves to step 1504, where the transceiver controller determines a new power value for the transceiver (e.g., a new transmit power select 1326). The controller may determine the new power value based on stored transmit power settings (e.g., transmit power data 1324), sensed transmit power (e.g., sensor transmit power data 1424), or a combination of the two. The controller then adjusts the transceiver conducted power in step 1506, then returns to step 1502 to monitor for beam state changes.

Figure 16:
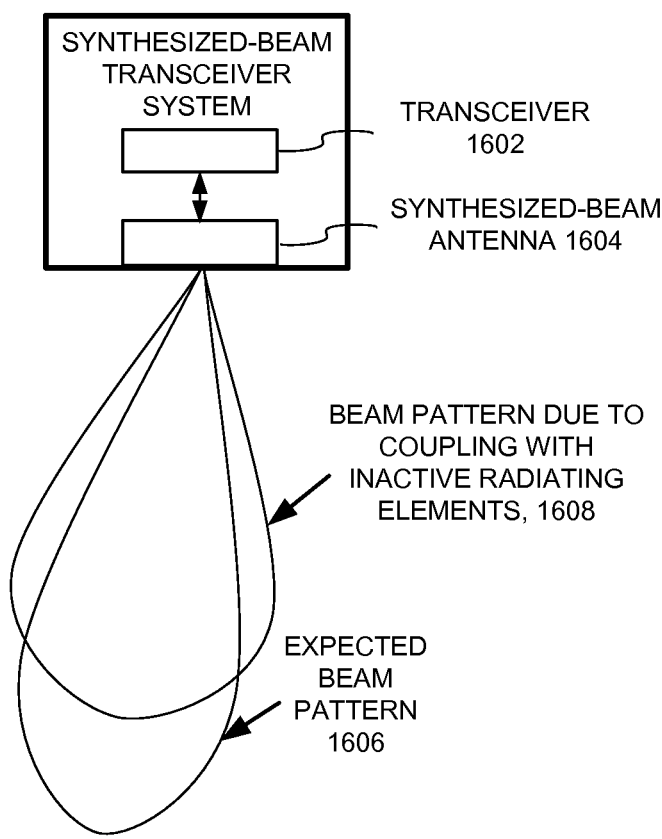
FIG. 16 depicts beam pattern variations in a synthesized-beam transceiver system due to coupling with floating antenna elements.

Other factors may also cause synthesized-beam gain degradation. FIG. 16 depicts a synthesized-beam transceiver system 1600 with beam pattern variations due to antenna element coupling. Transceiver system 1600 is similar to transceiver system 1100, with fixed-power transceiver 1602 similar to fixed-power transceiver 1102 and synthesized-beam antenna 1604 similar to antenna 1104. When transceiver system 1600 is commanded to synthesize a particular RF beam with a particular direction (e.g., expected beam 1606), in general not all of the antenna elements on SBA 1604 are activated or driven. Antenna elements that are not activated/driven may float (i.e., lack a low-impedance path to an RF input/output or a fixed potential), thereby coupling (electrically and/or magnetically) with active antenna elements. This coupling may result in a beam pattern 1608 different from the expected beam 1606 and potentially having an undesired shape and/or degraded peak radiated power.

Figure 17:
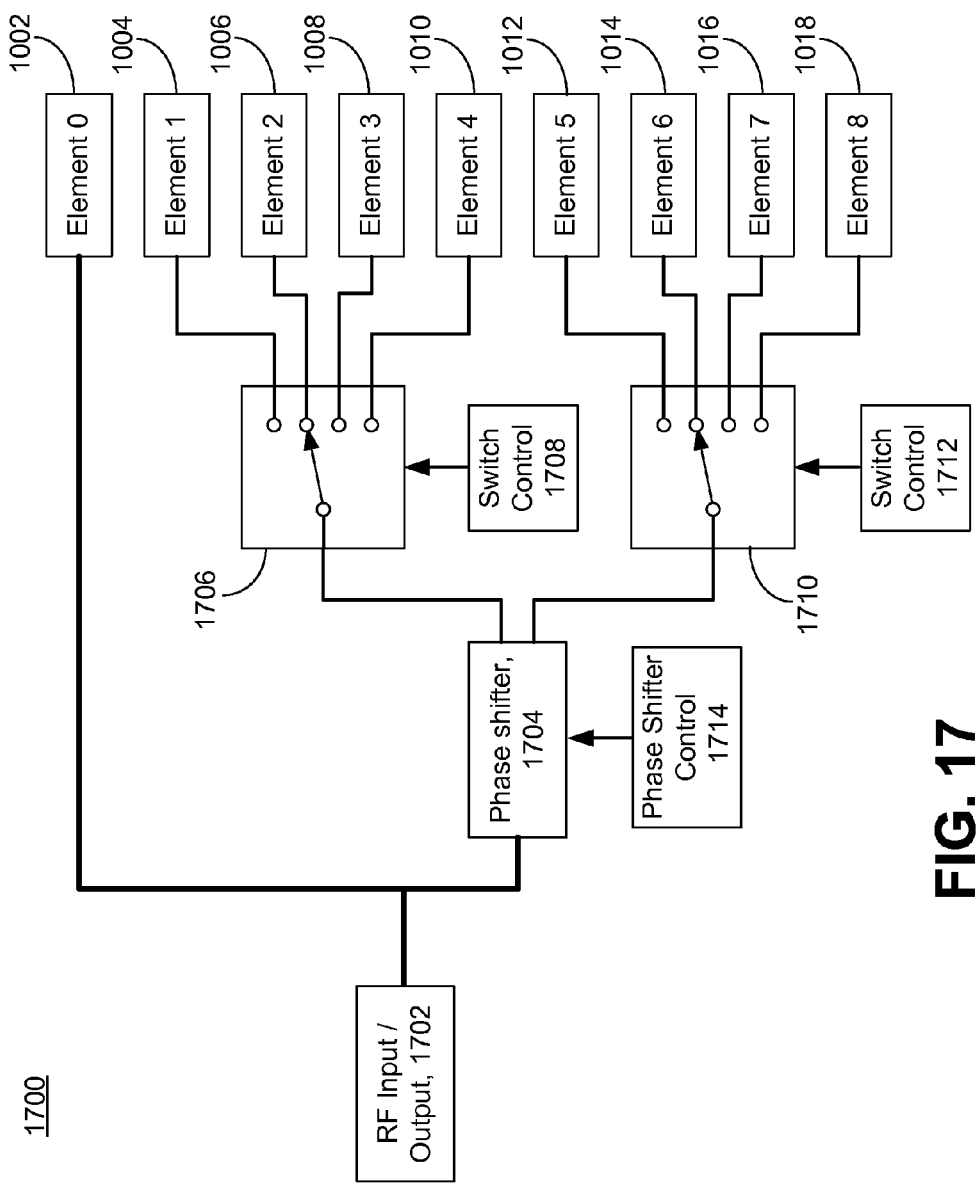
FIG. 17 is a block diagram of a synthesized-beam antenna steering system according to embodiments.

FIG. 17 is a block diagram of a synthesized-beam antenna steering system 1700 according to embodiments. Antenna steering system 1700 may be part of the synthesized-beam antenna (e.g., SBA 1204, 1320, 1604), part of the transceiver (e.g., reader 1302), or an entirely different module. The antenna steering system 1700 is coupled to antenna elements 1002-1018, and includes an RF input/output 1702, a phase shifter 1704, a phase shifter control 1714, antenna element switches 1706 and 1710, and switch controls 1708 and 1712. Phase shifter control 1714 and switch controls 1708 and 1712 receive control signals from a transceiver controller (e.g., reader controller 1304/1404) to synthesize RF beams. For example, if beam 1030 (shown in FIG. 10B) is to be synthesized, the controller directs switch controls 1708 and 1712 to adjust switches 1706 and 1710 to connect antenna element 2 (1006) and element 6 (1014) to phase shifter 1704. The controller also directs phase shifter control 1714 (and phase shifter 1704) to apply the appropriate phase shifts to the signals provided to the antenna elements.

Figure 18A:
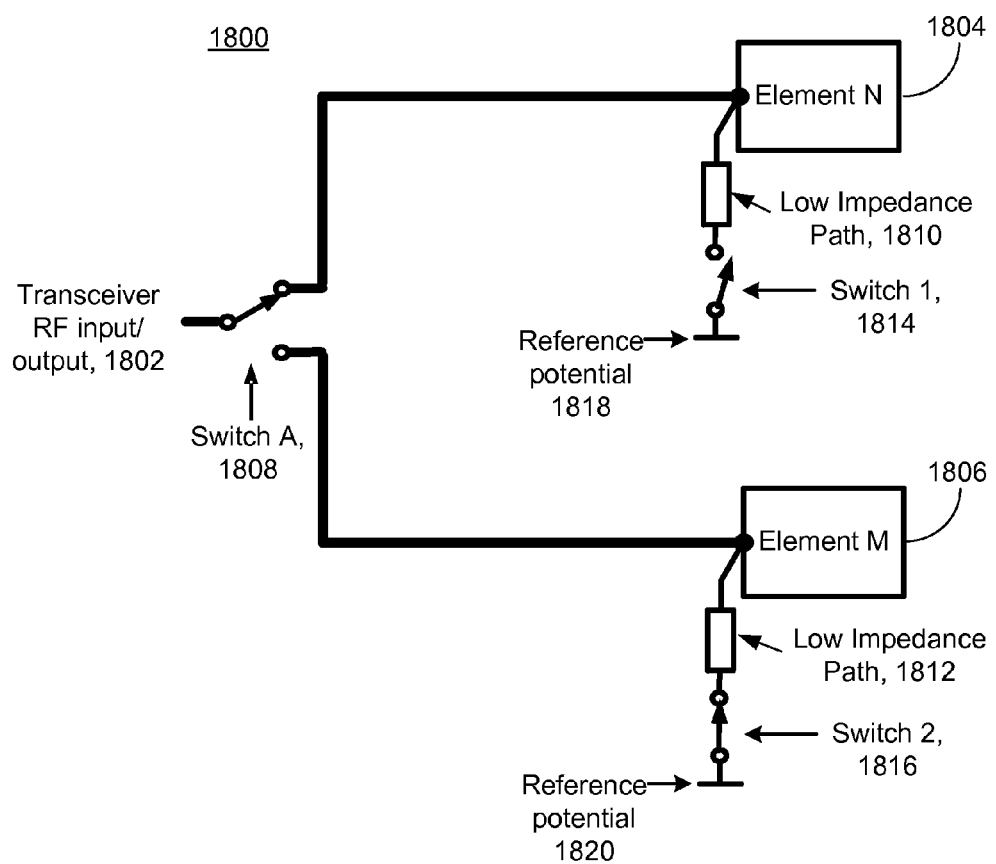
FIGS. 18A-C are block diagrams depicting details of synthesized-beam antenna termination systems according to embodiments.

As discussed above, antenna elements that are not driven or activated may couple with a synthesized beam, which may result in the beam having an unacceptable pattern or gain. In some embodiments, unused (i.e., unactivated or not driven) antenna elements may be terminated or electrically connected to a reference potential to prevent undesired coupling. For example, unused antenna elements may be connected to a particular DC bias, chassis ground (e.g., an antenna or reader housing or an antenna ground plane such as ground plane 908 in FIG. 9), earth ground, or any other suitable reference potential to prevent coupling. In some embodiments, the reference potential may also be used as a return for the activated/driven antenna elements. FIG. 18A is a block diagram depicting details of a synthesized-beam antenna element termination system 1800 according to embodiments. While termination system 1800 only depicts two antenna elements 1804 and 1806, more than two antenna elements in a synthesized-beam antenna may be terminated as depicted.

Termination system 1800 includes a switch 1808 (similar to switches 1706 and 1710 in FIG. 17) that electrically connects antenna element 1804 or antenna element 1806 to the RF input/output 1802 of the transceiver. Each antenna element is also electrically connected to a reference potential (1818/1820) via a low-impedance path (1810/1812) and a shunt switch (1814/1816), forming a low-impedance termination. In some embodiments, the low-impedance terminations are formed as close to the antenna feed points as possible. The shunt switches 1814 and 1816 may be controlled by a transceiver controller (e.g., reader controllers 1304/1404 in FIGS. 13 and 14) or a controller in the synthesized-beam antenna. When an antenna element is being used to synthesize a beam to transmit or receive a signal (i.e. is activated), its corresponding shunt switch disconnects it from the reference potential. For example, element 1804 is being used to synthesize a beam (as indicated by the position of switch 1808), and its shunt switch 1814 disconnects its low-impedance path 1810 from reference potential 1818. In contrast, when an antenna element is not being used to synthesize a beam (e.g., element 1806) its shunt switch (switch 1816) connects the low-impedance path 1812 to reference potential 1820. Thus, unused antenna element 1806 is shunted (i.e., electrically connected) to a reference potential via a low-impedance path and will not couple to the synthesized RF beam.

Figure 18B:
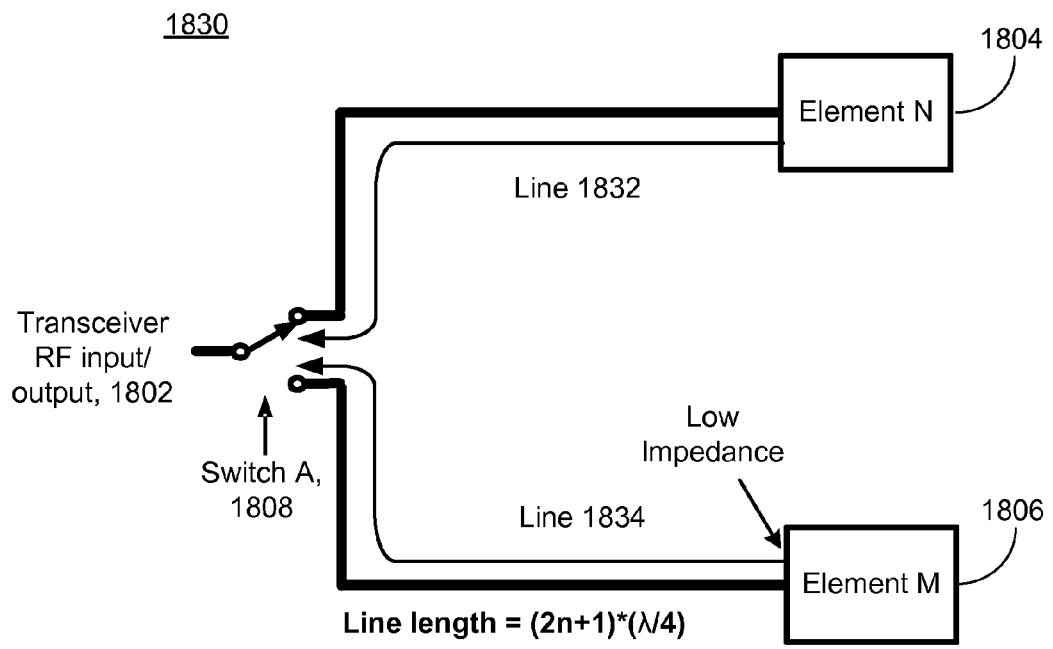

Antenna elements may also be terminated without shunt switches by appropriate line impedance design. FIG. 18B is a block diagram depicting details of a synthesized-beam antenna element termination system 1830 without shunt switches according to embodiments. Similar to termination system 1800, termination system 1830 includes antenna elements 1804 and 1806 and switch 1808 that either connects antenna element 1804 or antenna element 1806 to the transceiver RF input/output 1802. Termination system 1830 also includes lines 1832 and 1834 that connect the terminals of switch 1808 to antenna elements 1804 and 1806. The lines are designed to have low open-circuit impedances such that connected antenna elements are electrically connected to a reference potential when they are disconnected from the transceiver RF input/output. For example, line 1834 is designed to have a low impedance when switch 1808 does not connect transceiver RF input/output 1802 to antenna element 1806.

As described above, the impedances of lines 1832 and 1834 when disconnected from transceiver input/output 1802 (their "open-circuit impedances") can be designed to be low at the transceiver operating frequencies in order to electrically connect antenna elements to a reference potential such as chassis ground, earth ground, or any other suitable potential. Line impedance is based on line length, the dielectric constant of the material the line is fabricated upon, and the frequency of the RF signals driving the antenna elements (i.e., the transceiver operating frequencies). Therefore, when lines 1832 and 1834 have lengths that satisfy the relation $$\text{length} = (2n + 1) * \frac{\lambda}{4}$$

where n is a real, nonnegative integer (e.g., 0, 1, 2, 3, . . . ) and λ is the wavelength (itself determined via the relation $$= \frac{c}{f * \sqrt{\varepsilon_r}},$$

where c is the speed of light, f is the transceiver operating frequency, and $\varepsilon_r$ is the dielectric constant of the material the line is fabricated upon), they will have low open-circuit impedances at the transceiver operating frequency, which allow their associated antenna elements to be electrically connected to a reference potential (e.g., ground).

Figure 18C:
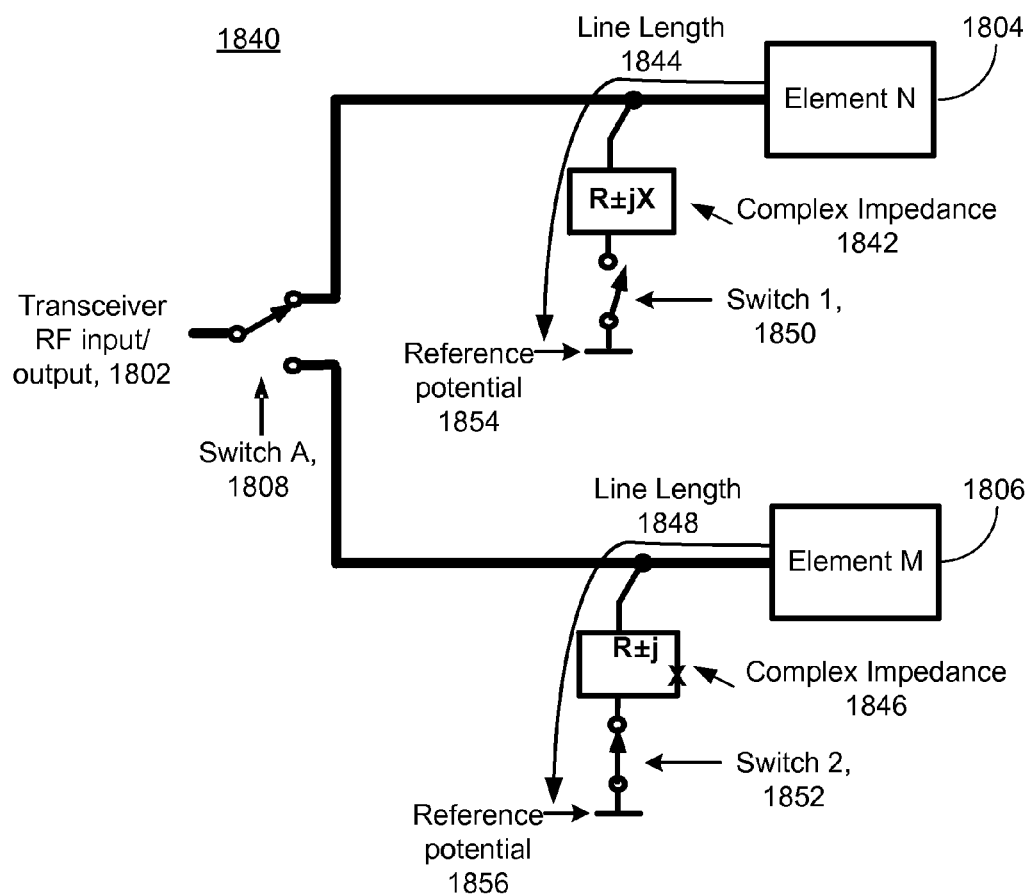

FIG. 18C is a block diagram depicting details of a synthesized-beam antenna element termination system 1840 with shunt switches and complex impedance paths according to embodiments. Similar to termination systems 1800 and 1830, termination system 1840 includes antenna elements 1804 and 1806 and switch 1808 that electrically connects either antenna element 1804 or antenna element 1806 to transceiver RF input/output 1802. Similar to termination system 1800, system 1840 includes switches (1850 and 1852) that electrically connect antenna elements 1804 and 1806 to reference potentials 1854 and 1856. Termination system 1840 also includes complex impedances 1842 and 1846, each of which electrically connect an antenna element (1804/1806) to a reference potential (1854/1856) when the associated switch (1850/1852) is closed. Complex impedances 1842 and 1846 are represented by resistive (R), inductive (+jX), and capacitive (−jX) constituent impedances. By selecting appropriate values for complex impedances 1842/1846 and the line lengths 1844/1848, a low-impedance path can be provided between each antenna element and reference potential.

Figure 19:
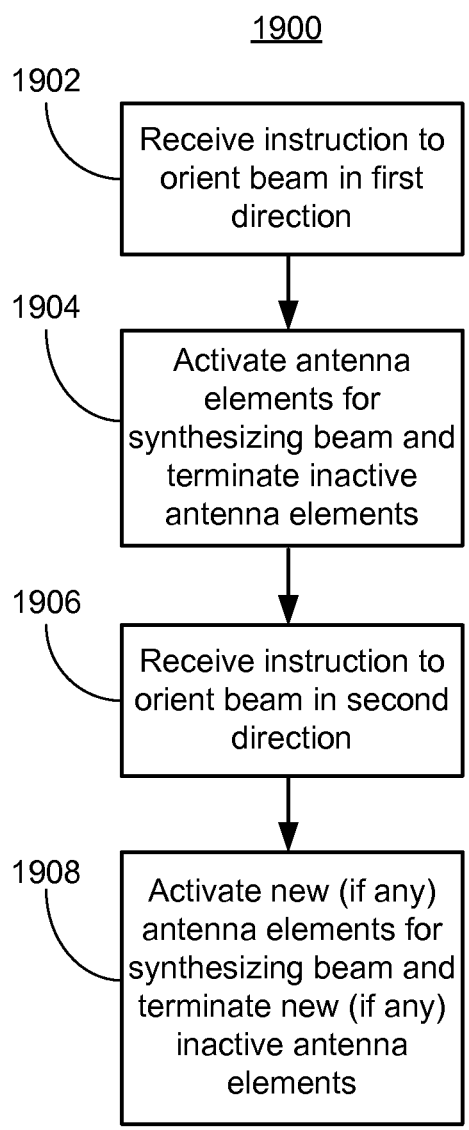
FIG. 19 is a flowchart depicting a synthesized-beam antenna steering process according to embodiments.

FIG. 19 is a flowchart depicting a steering and termination process 1900 for a synthesized-beam transceiver system (e.g., a synthesized-beam reader system) according to embodiments. Process 1900 begins at step 1902, where the transceiver system receives instructions to steer or synthesize a first RF beam oriented in a first direction (e.g., in the direction of beam 1030 in FIG. 10B) for transmitting or receiving a signal. In step 1904, the transceiver system determines the particular antenna elements that must be activated or driven to synthesize the first beam, which in some embodiments are the antenna elements on a first axis (e.g., elements 1002, 1006, and 1014 for axis 1020 in FIG. 10A), and proceeds to activate those elements and simultaneously terminate (i.e., shunt to a reference potential) at least one other inactive antenna element (e.g., at least one of elements 1004, 1008-1012, and 1016-1018 in FIG. 10).

Subsequently, the transceiver system receives instructions in step 1906 to synthesize a second RF beam oriented in a second direction different from the first direction. The transceiver system then determines in step 1908 if new antenna elements should be activated (or deactivated) to synthesize the second beam. For example, if the second direction lies on the plane associated with the first axis (e.g., the direction of beam 1034 in FIG. 10B), then the transceiver system may not need to activate new elements, and instead may adjust the phase differences of the waveforms provided to the activated elements. However, in some embodiments, if off-axis elements are activated (e.g., to assist in beam-shaping), then new elements may need to be activated or deactivated even if the second direction is on the plane associated with the first axis. If the system determines that new elements should be activated or deactivated, it proceeds to activate and deactivate those elements and to further terminate newly deactivated elements.

In some embodiments, steering and termination process 1900 may be combined with the synthesized-beam gain compensation process 1500 described in FIG. 15. For example, a synthesized-beam transceiver system may both terminate unused, inactive antenna elements and adjust conducted power to achieve a desired beam power or shape.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented, according to embodiments formed, individually and/or collectively, by a wide range of hardware, software, firmware, or virtually any combination thereof.

The present disclosure is not to be limited in terms of the particular embodiments described in this application, which are intended as illustrations of various aspects. Many modifications and variations can be made without departing from its spirit and scope, as will be apparent to those skilled in the art. For example, transceivers in this disclosure are interchangeable with RFID readers, and vice-versa. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). Where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member.

We claim:

1. A method for steering a beam of a two-dimensional array of antenna elements, the method comprising:
    activating a first subset of the elements to orient the beam in a first direction;
    shunting RF energy coupled to at least one element not in the first subset by electrically connecting the at least one element not in the first subset to a reference potential, wherein electrically connecting at least one element not in the first subset to the reference potential includes electrically connecting all elements adjacent to the elements in the first subset to the reference potential; and
    subsequently,
        activating a second subset of the elements to orient the beam in a second direction different from the first direction, and
        shunting RF energy coupled to at least one element not in the second subset by electrically connecting the at least one element not in the second subset to the reference potential.

2. The method of claim 1, wherein the first subset of elements is on a first axis.

3. The method of claim 1, wherein the at least one element not in the first subset is in the second subset.

4. The method of claim 1, wherein the reference potential is at least one of an antenna ground plane, chassis ground, and earth ground.

5. The method of claim 1, wherein the reference potential is used as a return for the activated elements.

6. A two-dimensional antenna array for synthesizing a steerable beam, comprising:
    a plurality of antenna elements, and
    processing circuitry configured to
        activate a first subset of the elements to orient the beam in a first direction;
        shunting RF energy coupled to at least one element not in the first subset by electrically connecting the at least one element not in the first subset to a reference potential, wherein electrically connecting at least one element not in the first subset to the reference potential includes electrically connecting all elements adjacent to the elements in the first subset to the reference potential;
    subsequently,
        activate a second subset of the elements to orient the beam in a second direction different from the first direction, and
        shunting RF energy coupled to at least one element not in the second subset by electrically connecting the at least one element not in the second subset to the reference potential.

7. The array of claim 6, wherein the first subset of elements is on a first axis.

8. The array of claim 6, wherein the at least one element not in the first subset is in the second subset.

9. The array of claim 6, wherein the reference potential is at least one of an antenna ground plane, chassis ground, and earth ground.

10. A method for orienting a beam of a two-dimensional array of antenna elements, the method comprising:
    activating a first subset of the elements to orient the beam in a first direction;
    shunting RF energy coupled to at least one inactive element not in the first subset by electrically connecting the at least one inactive element to a reference potential, wherein electrically connecting at least one inactive element includes electrically connecting all inactive elements adjacent to the activated elements to the reference potential;
    subsequently,
        activating a second subset of the elements to orient the beam in a second direction different from the first direction, and
        shunting RF energy coupled to at least one inactive element not in the second subset by electrically connecting the at least one inactive element to the reference potential.

11. The method of claim 10, wherein an inactive element is subsequently an activated element.

12. The method of claim 10, wherein the reference potential is at least one of an antenna ground plane, chassis ground, and earth ground.

13. The method of claim 10, wherein the reference potential is used as a return for the activated elements.

14. A two-dimensional antenna array for synthesizing a steerable beam, comprising:
    a plurality of antenna elements, and
    processing circuitry configured to
        activate a first subset of the elements to orient the beam in a first direction;
        shunting RF energy coupled to at least one inactive element not in the first subset by electrically connecting at the east one inactive element to a reference potential, wherein electrically connecting at least one inactive element to the reference potential includes electrically connecting all inactive elements adjacent to the activated elements to the reference potential;
    subsequently,
        activate a second subset of the elements to orient the beam in a second direction different from the first direction, and
        shunting RF energy coupled to at least one inactive element not in the second subset by electrically connecting the at least one inactive element to the reference potential of the antenna array.

15. The array of claim 14, wherein an inactive element is subsequently an activated element.

16. The array of claim 14, wherein the reference potential is at least one of an antenna ground plane, chassis ground, and earth ground.

* * * * *